Feb. 6, 1934.  L. BROSILOW ET AL  1,946,128
AUTOMATIC CORD TAKE-UP AND PAY-OUT DEVICE FOR ELECTRIC LAMPS
Filed Nov. 12, 1931
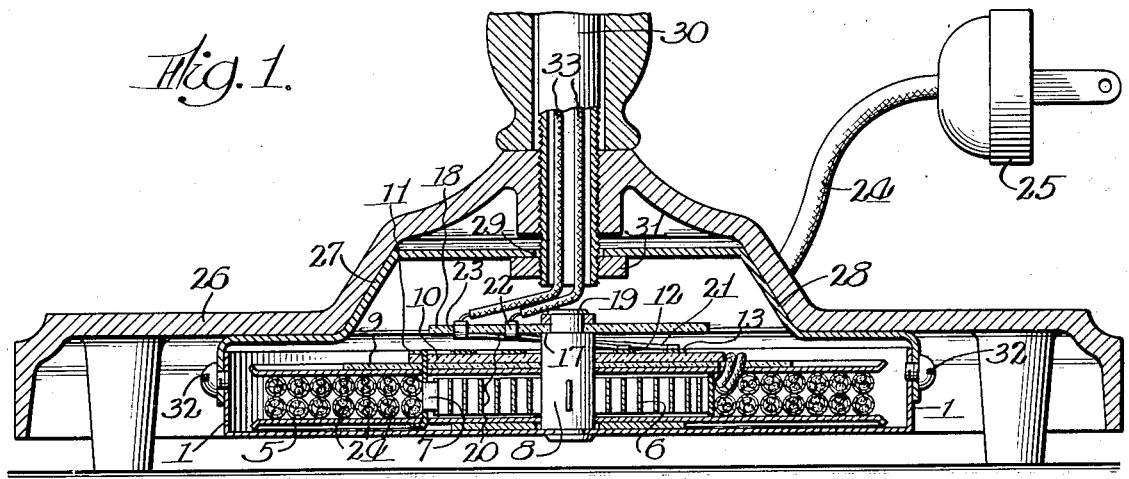
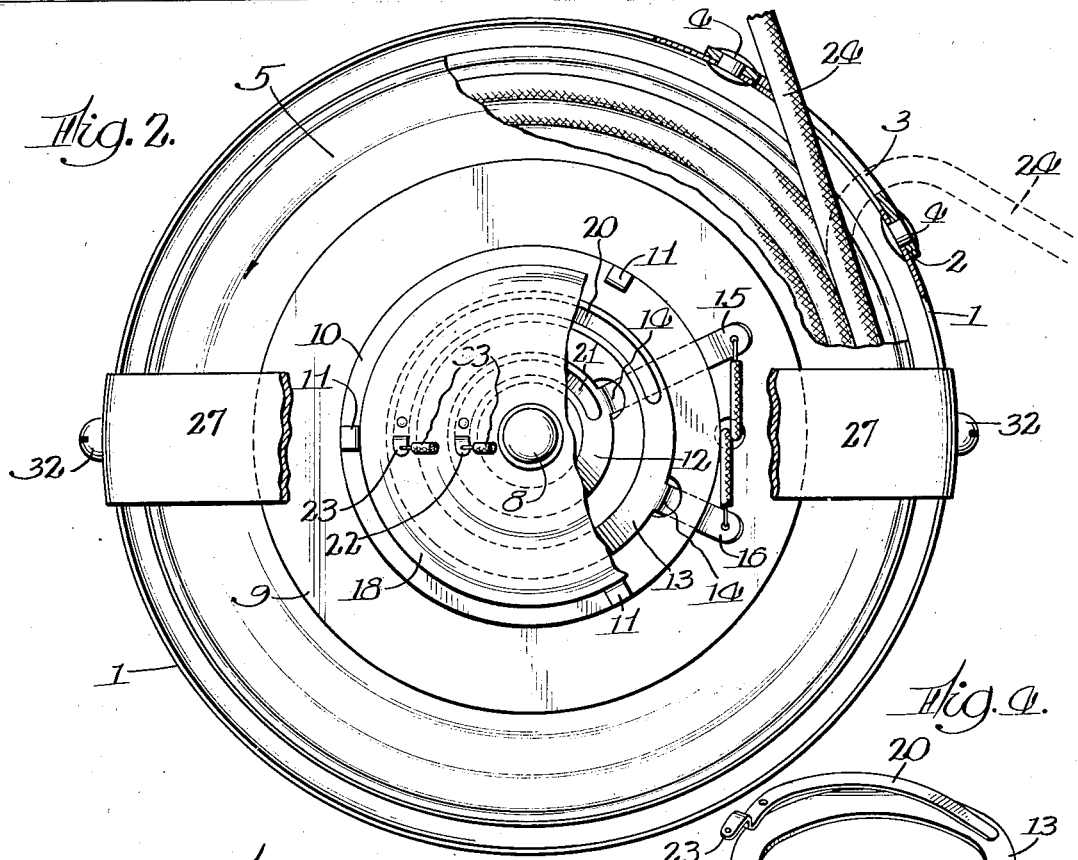
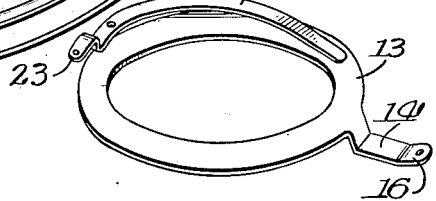
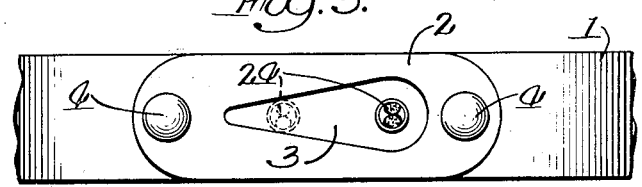

Patented Feb. 6, 1934

1,946,128

UNITED STATES PATENT OFFICE 1,946,128

AUTOMATIC CORD TAKE-UP AND PAY-OUT DEVICE FOR ELECTRIC LAMPS

Louis Brosilow, William Markoff, and John Orosz, Chicago, Ill.

Application November 12, 1931
Serial No. 574,654

6 Claims. (Cl. 240—81)

This invention relates to improvements in electric cord or wire take-up and pay-out devices especially adaptable for portable electric lamp constructions, the invention having for an object, to provide a device of the stated character whereby the length of electric cord extended from an equipped lamp may be adjusted or regulated so as to permit the making of efficient electrical connection with an electrical floor or wall plug fixture or other source of electrical energy, and, at the same time, dispense with the presence of a surplus amount of cord as between the lamp and the source of energy.

Another and equally important object of the invention is to provide a device of the above character in which the electric cord utilized to supply electricity to the lamp lighting fixtures will be normally retained in a completely housed, protected and substantially concealed position and which, when desired, can be paid out or extended from the lamp to the required length for electrical connection with a source of electricty supply and retained in such paid out position; also, which may be automatically fully or partially taken up by said device.

It is also an object of the invention to provide an electric cord take-up and pay-out device so constructed and designed, that the same may be attached, as a complete working unit, to any prevalent type of portable electric lamp without material alteration thereof and in a most economical manner. Yet another object of the invention may be stated to provide the device with means for checking or braking the automatic taking up of an extended length of electric cord by the same, hence, enabling a user to practically and satisfactorily connect the cord of an equipped lamp to a plug fixture or other source of energy and to permit the extended length of cord to loosely rest as between said lamp and source of energy without pull or other disturbing influence from the device, until desired.

Other objects of the invention will be in part obvious and in part pointed out hereinafter.

In order that the invention and its mode of operation may be readily understood by those skilled in the art to which it appertains, we have in the accompanying illustrative drawing and in the following detailed description based thereupon, set out one possible embodiment of our invention.

In this drawing:

Figure 1 is a fragmentary vertical section through the base of a portable electric lamp equipped with the invention;

Figure 2 is a top plan view of the take-up and pay-out device having portions thereof broken away;

Figure 3 is an enlarged fragmentary detail and side elevation of a portion of the side wall or periphery of the reel casing illustrating the means for securing an extended length of electric cord against take up by the reel, and, Figure 4 is a detail in perspective illustrating one of the collector rings and its respective contact arm.

Having more particular reference to the drawing, in connection with which like characters of reference will designate corresponding parts throughout, the invention may be stated to comprise a rotatable reel receiving and supporting casing indicated by the numeral 1. This casing is preferably of circular shape, corresponding to the shape of the cord reel received thereby and, of course, the same may be constructed of sheet metal or of any other suitable material such as conditions or preference may dictate. A portion of the side wall or periphery of the casing is cut away or is formed with an opening, and over this cut away portion or opening, there is fixedly mounted a plate 2, preferably formed of compressed fibre or like material, having a tapered way 3 formed in and extending longitudinally of the same, said plate 2 being effectually secured to adjacent portions of the periphery of the casing as by rivets 4. Of course, it is to be understood that under some circumstances, the fibre plate 2 may be completely dispensed with, and the peripheral portion of the casing 1, instead of being cut away, as indicated above, may be formed with a longitudinally disposed tapered opening corresponding to the tapered opening or way 3.

Concentrically arranged within the casing 1 is a reel 5 provided with a hollow hub portion in which there is received a coiled spring 6 of the clock type. One end of this spring is fixedly connected, as at 7, to an appropriate portion of the reel hub, while the remaining and inner end thereof is fixedly connected to a pivot pin or rivet 8 which is passed through a suitable opening formed in the concentric portion of the bottom of the casing 1 and is non-rotatably positioned with respect to the casing. It will be thus understood that when the reel 5 is rotated in a certain direction, the spring 6 will be placed under a progressive tension, with the result that when said reel is released, it will be caused to automatically rotate under urge from the tensioned spring 6 in a counter direction.

Arranged upon the normally upper and exposed side of the reel 5 is a disc 9 formed of insulating material, over which a second disc 10, also of insulating material, is arranged, the two discs being fixedly connected to the adjacent side of the reel by suitable securing devices, as for example, tongues 11 struck upwardly from adjacent portions of the reel side and passed through adjacent portions of the superimposed discs 9 and 10, and then clinched upon the uppermost disc 10.

The disc 10 receives upon its exposed side, a pair of relatively concentrically arranged and spaced collector rings 12 and 13, the former being of a size smaller than the latter, as is evident from the accompanying drawing. These collector rings 12 and 13 are fixedly connected to the adjacent disc 10 through the medium of tongues 14 which are formed upon or secured to the marginal portions of each of said rings, and as is shown in the accompanying drawing, are bent downwardly at angles to their respective rings and passed through adjacent portions of the disc 10 into clinching engagement with the under side thereof. Also, each of said rings 12 and 13 are formed with tongue-like contact terminals 15 and 16, which are passed downwardly through openings formed in adjacent portions of the disc 10 and are extended outwardly between the two discs 9 and 10 to distances whereat the free ends of said terminals will be slightly exposed beyond the marginal portion of the discs 10 in relatively spaced relation. It, of course, will be understood that the terminal 15 of the smaller or inner collector ring 12 will be positively insulated from the larger collector ring 13 in its outward disposition and further, that this terminal 15 will be of a length greater than that of the terminal 16 in order that the exposed free extremities thereof will be substantially the same.

The upper or free extremity of the pivot pin 8, which is extended for a distance beyond the disc 10 is formed with an annular shoulder 17 adapted to immovably receive and support thereupon, a substantially rigid disc 18, formed of electric insulating material; the outer end of the reduced portion of the pivot pin being swaged or upset as at 19, whereby to immovably and rigidly connect said disc to the pivot pin. Carried upon the underside of the immovable disc 18 are a pair of radially spaced, arcuately shaped spring metal contact arms 20 and 21, certain of the ends of the arms being provided with tongue portions 22 and 23 which are passed through adjacent portions of the disc 18 and then bent over upon themselves to provide electrical contact terminals and a means for effectually connecting the contact arms 20 and 21 in their positions with relation to the under side of the disc 18. The contact arms 20 and 21 are bent upon themselves adjacent the lower face of the disc 18 so as to ensure their spring contact or engagement with the collector rings 12 and 13 respectively. In this way, it will be understood that with rotation of the reel 5, the collector rings 12 and 13 will be rotated therewith, and during such rotation, that said collector rings will be constantly contacted by their respective arms 20 and 21 carried upon the non-rotatable or immovable disc 18.

Electric wire or cord of the duplex conductor type is indicated by the numeral 24, and is adapted to be engaged about the reel 5, the inner end of the cord being divided so as to permit branching of the several conductors therein and the effecting of electrical connection as between the individual conductors and the terminals 15 and 16. The remaining end of the electric cord is preferably provided with an ordinary floor or wall socket plug connection 25. Cord 24 is adapted to be coiled about the reel 5, and obviously, as the free portion of the cord is drawn from the reel, the latter will be rotated in a direction to effect a progressive tensioning of the clock spring 6 in the hollow hub of the reel. Thus, when the free or extended portion of the cord 24 is released, the reel 5 will be caused to rotate in a counter direction under tension of the spring 6, thereby effecting a rewinding of the cord upon the reel. In order that an extended portion of the cord 24 may be maintained extended with respect to the reel casing and that the reel 5 may be secured against rotary movement, the free portion of such cord is passed through the tapered way 3 in the plate 2. Accordingly, by laterally moving the cord 24 at the point of its passage through the tapered way 3, the same may be brought into binding engagement with the reduced portion of such way and the cord will be "pinched" in a manner to prevent subsequent rotation of the reel 5 or disturbing of the extended length of the cord by reason of influence of the reel 5 thereupon. At this point, it is of importance to note that because of the fact that the longitudinally disposed and tapered way 3 in the plate 2 is so arranged that the tapered extremity thereof is disposed outwardly or laterally of the centrifugal throw of the reel, the cord 24 in passing through the way 3 will have a tendency, because of the centrifugal force occasioned with rotation of said reel 5, to move to the tapered portion of the way and be "pinched" or gripped by the same. In this way, an automatic braking of the reel 5 will be effected. Free rotation of the reel 5 and free passage of the cord 24 through the way 3 may be effected by so positioning the cord 24 as it passes through the way 3, as to travel through the larger portion of the tapered way.

To permit attaching or connecting of the reel casing 1 to a lamp base such as designated by the numeral 26, we provide said casing with a diametrically disposed bracket 27, the intermediate portion of which is outwardly disposed or bowed, as indicated at 28 and formed with an intermediately arranged opening 29. The base 26, as is usual, is provided with an internally screw-threaded opening or fitting adapted to receive the screw-threaded lower end of the lamp standard connecting or coupling pipe 30. The screw-threaded portion of the pipe 30 is of a length greater than is usual in such constructions and by reason of this greater length, is permitted to extend for a distance downwardly from the under or inner side of the lamp base, hence, permitting the extended end to be engaged through the opening 29 in the bracket 27, whereupon a locking nut 31 is turned into engagement with the screw-threaded end of the pipe to cause locking of the bracket onto the adjacent portion of the lamp base. The bracket 27 may be secured in any suitable manner to the peripheral portion or side walls of the casing 1, as for example, by connecting screws 32, rivets, or other suitable fastening devices.

Electrical conductors 33 are passed through the pipe 30 upwardly into electrical connection with the lighting fixtures of the equipped lamp; the lower or free ends of these conductors being electrically connected to the tongue or terminal portions of the contact arms 22 and 23. In this way, it will be understood that the lighting fixtures connected to the conductors 33 will be included, in series, with the electrical circuit to be subsequently established through the conductors of the electric cord 24, the collector rings 12 and 13, the contact arms 22 and 23 and the conductors 33.

From the foregoing description, it is believed that the mode of operation of our improved electric cord take-up and pay-out device will be understood by workers skilled in the art. Attention, however, is invited to the fact that the device is of such construction and arrangement as will permit of its adaption or connection to a portable electric lamp as a complete working unit without material alteration or modification of the now prevalent types of lamp construction, the only modification of construction being that the lower screw-threaded end of the coupling pipe 30 is extended for a distance beyond the under side of the lamp base to permit of the connection of the casing bracket 27 thereto in the manner hereinbefore explained. When attached to a lamp construction, it will be observed that the device will be normally concealed from view, inasmuch as the same is arranged adjacent the under side of the lamp base. Furthermore, the working parts of the device will be effectually protected by reason of the fact that the bottom of the casing 1 is closed. Ready access to the interior of the device may be had by disengaging the casing from the coupling pipe 30 and then moving casing downwardly or away from the base to expose the open inner or normally upper side thereof.

Manifestly, the construction shown is capable of considerable modification, and such modification as is within the scope of our claims, we consider within the spirit of our invention.

We claim:

1. In a device of the character described, the combination with a portable electric lamp construction including a base and a standard connecting pipe engaged with the base, that portion of said pipe engaging the base being extended for a distance below the same, of a casing having an outlet way therein, a reel rotatably received within the casing communicating with the outlet way, a plurality of collector rings carried upon one side of said reel and electrically insulated therefrom, a multiple conductor electric cord engageable about said reel and passing through the outlet way in the casing, certain of the ends of said cord conductors being electrically connected to said rings, contact arms non-rotatably supported by the casing having constant electrical wiping contact with said rings throughout their respective paths of rotary movement, a bracket connected to and disposed over the casing in spaced relation to said contact arms and rings, said bracket engaged with the extended end of the standard connecting pipe, and locking means engaging the extended end of said pipe and said bracket for securing the latter in positive engagement with the under side of the lamp base.

2. In a device of the character described, the combination with a portable lamp construction, including a base and a standard connecting pipe engaged with the base, that portion of the standard connecting pipe engaging the lamp base being extended for a distance into the same, a casing having an outlet way in a portion thereof, an electric cord receiving reel mounted within the casing, the cord of which is adapted to be passed through the outlet way, and a bracket connected to the casing adapted to be fixedly connected to the extended portion of said standard connecting pipe having a part thereof in fixed abutting contact with a portion of the adjacent side of said lamp base.

3. In a device of the character described, the combination with a portable electric lamp construction, including a base and a standard connecting pipe engaged with the base, that portion of the standard connecting pipe engaging the lamp base being extended for a distance into the same, a casing having an outlet way in a portion thereof, an electric cord receiving reel within the casing, the cord of which passes through the outlet way, and a bracket arranged over and connected to the casing having a portion of the same outwardly offset and spaced with respect to the casing, the offset portion of the bracket engaging over the extended end of the standard connecting pipe and being fixedly connected thereto, and the opposite sides of the offset portion of the bracket flushly engaging with portions of the adjacent side of said base.

4. In a device of the character described, the combination with a portable electric lamp construction, including a base and a standard connecting pipe engaged with the base, that portion of the standard connecting pipe engaging the lamp base being extended for a distance into the same, a reel receiving casing positioned in proximity to the lower side of the lamp base, and a bracket connected to and arranged over the upper side of the casing, said bracket having a portion thereof engaged with and connected to said extended end of the standard connecting pipe whereby the bracket will be engaged with the lower side of the lamp base in fixed abutting engagement therewith.

5. In a device of the character described, a casing having a tapered way formed in one side thereof, a reel rotatably mounted in the casing, an electric cord connected to and received thereabout, a portion of said cord passing through said tapered way and being normally received through the larger portion thereof, the smaller and tapered end of the way being so disposed with respect to said casing that upon rotary movement of the reel in one direction, the centrifugal force incident thereto will cause that portion of the cord passing through the larger portion of the way to be automatically moved therefrom and into binding engagement with the opposite sides of the smaller and tapered portion of the way whereby to stop further rotation of said reel and to discontinue passage of the cord through said way.

6. In a device of the character described, the combination with a portable lamp construction including a base having a cup-like chamber formed in the under side thereof and a standard connecting pipe engaged with the base, a casing having an outlet way in a portion thereof received adjacent the under side of said base and in proximity to said cup-like chamber, an electric cord receiving reel rotatably mounted in the casing the cord of which is adapted to be passed through said outlet way, a bracket disposed diametrically over said casing and connected at its opposite ends to adjacent portions of the casing, the intermediate portion of said bracket being offset with respect to the casing and the side walls of the offset portion of the bracket being shaped to have snug and flush bearing engagement in and with the adjacent portions of the side walls of the cup-like chamber of said base, and means for fixedly connecting the offset portion of said bracket adjacent the upper end and inner side of said base.

LOUIS BROSILOW.
WILLIAM MARKOFF.
JOHN OROSZ.